Nov. 17, 1925.
S. G. DOWN
1,561,702
BRAKE SHOE CONSTRUCTION
Filed Nov. 1, 1923
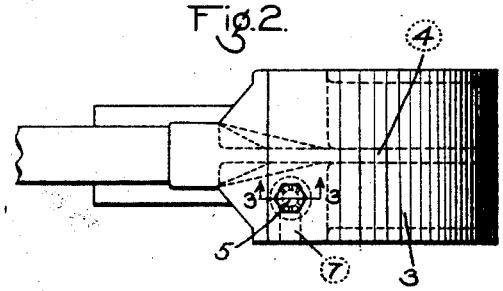
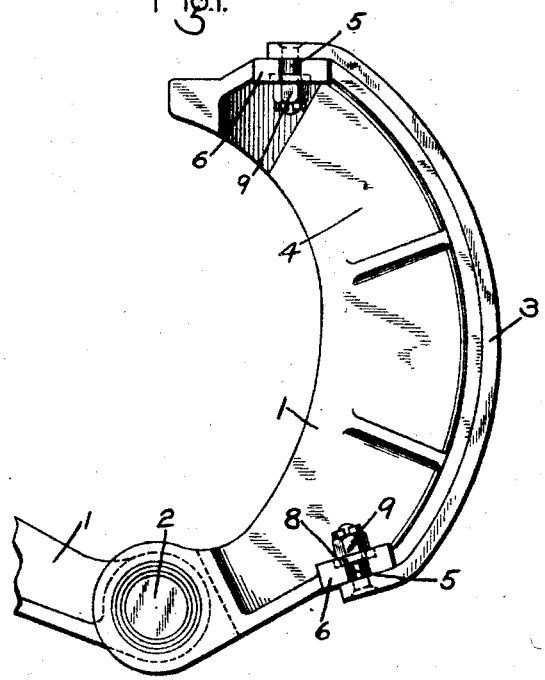
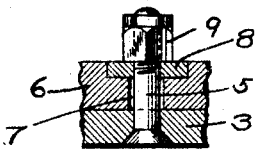
INVENTOR
SIDNEY G. DOWN
BY *Wm. M. Cady*
ATTORNEY Patented Nov. 17, 1925.

1,561,702

UNITED STATES PATENT OFFICE.

SIDNEY G. DOWN, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

BRAKE-SHOE CONSTRUCTION.

Application filed November 1, 1923. Serial No. 672,120.

*To all whom it may concern:*

Be it known that I, SIDNEY G. DOWN, a citizen of the United States, residing at Pittsburgh, in the county of Allegheny and State of Pennsylvania, have invented new and useful Improvements in Brake-Shoe Constructions, of which the following is a specification.

This invention relates to brake shoes, and more particulraly to a brake shoe construction for a brake of the internal expanding drum type, such as employed on motor vehicles.

The principal object of my invention is to provide an improved brake shoe construction of the above character.

In the accompanying drawing; Fig. 1 is an elevational view of a brake shoe head, showing my improved brake shoe construction applied thereto; Fig. 2 a plan view of the construction shown in Fig. 1; and Fig. 3 a section on the line 3—3 of Fig. 2.

As shown in the drawing, brake heads 1 of the internal expanding type are provided, the heads being connected by a pivot pin 2, and having the usual means (not shown) for expanding said heads, so that the brake shoes applied to the brake heads will frictionally engage the internal friction face of a brake drum (not shown).

Each brake head 1 is provided with an arcuate bearing face to which is applied a brake shoe 3. According to my invention, said brake shoe consists of a flat plate with its opposite ends bent slightly inwardly. Each end of the brake shoe is provided with a countersunk opening disposed at one side of the central web 4 of the brake head and adapted to receive a bolt 5 having a corresponding countersunk head.

The brake head 1 is provided with a lug 6 at each end having a transverse slot 7 for receiving the bolt 5 and being countersunk for a washer 8.

The shoe 3 is applied by a transverse movement of the shoe relative to the brake head 1 and with the bolts 5 previously positioned in the shoe. The slots 7 permit transverse movement of the bolts 5 and when the shoe is in position on the brake head, the washer 8 is applied to each bolt 5 and is fitted into the countersink portion of the lug 6.

A nut 9 is then applied to each bolt 5 and is screwed down so as to tightly clamp the brake shoe to the brake head.

By means of the above brake shoe construction, the ends of the brake shoe are held down and are prevented from curling up under the action of heat generated in applying the brake, thus ensuring even wear of the brake shoe throughout its extent.

The construction also permits the application and removal of the brake shoe without removing the vehicle wheel, as will be evident.

It will be noted that when the washer 8 is applied in the countersunk recess in the lug 6, said washer serves to prevent lateral movement of the brake shoe.

By reason of the fact that the ends of the brake shoe are bent inwardly away from the arcuate face of the shoe, the brake shoe is not worn down at the ends and consequently the countersunk heads of the holding bolts will not be worn down so as to permit possible loosening of the shoe.

Having now described my invention, what I claim as new and desire to secure by Letters Patent, is:—

1. The combination with a brake head having an arcuate face and having a lug at each end of the arcuate face provided with a transverse slot, of a brake shoe formed to engage said face and provided with openings adapted to register with said slots, and a bolt extending through each opening and slot for clamping said shoe against the brake head.

2. The combination with a brake head having an arcuate face and having a lug at each end of the arcuate face provided with a transverse slot, of a brake shoe formed to engage said face and provided with openings adapted to register with said slots, a bolt extending through each opening and slot for clamping said shoe against the brake head, and a washer on each bolt and engaging in a recess in each lug for preventing transverse movement of said shoe relative to said brake head.

In testimony whereof I have hereunto set my hand.

SIDNEY G. DOWN.